No. 646,300. Patented Mar. 27, 1900.
W. G. MIZELL.
SCALE PAN.
(Application filed Nov. 9, 1899.)
(No Model.)
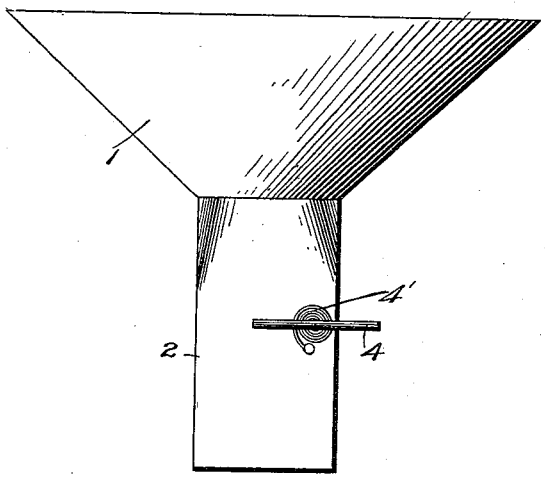
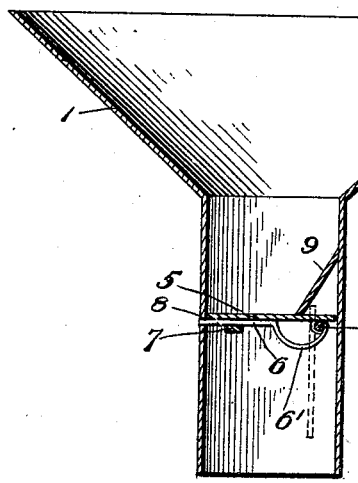
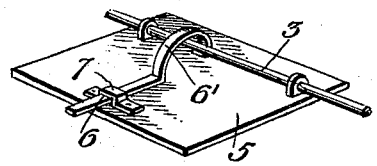
Witnesses
Inventor
W. G. Mizell

UNITED STATES PATENT OFFICE.

WILLIAM GASTON MIZELL, OF WINDSOR, NORTH CAROLINA.

SCALE-PAN.

SPECIFICATION forming part of Letters Patent No. 646,300, dated March 27, 1900.

Application filed November 9, 1899. Serial No. 736,330. (No model.)

*To all whom it may concern:*

Be it known that I, WILLIAM GASTON MIZELL, a citizen of the United States, residing at Windsor, in the county of Bertie and State of North Carolina, have invented certain new and useful Improvements in Scale-Pans; and I do declare the following to be a full, clear, and exact description of the invention, such as will enable others skilled in the art to which it appertains to make and use the same.

The invention relates to scale-pans, and more particularly to that class of the funnel shape, in which the material after having been weighed may be discharged from the pan without removing it from the scales.

The object of the invention is to simplify the construction and provide a device of this character which will not get out of order and by means of which much time and labor will be saved in the weighing of different articles.

To this end the invention consists in certain features of construction and combination of parts, which will be hereinafter fully described and claimed.

In the accompanying drawings, Figure 1 is a side elevation of my improved scale-pan. Fig. 2 is a longitudinal sectional view. Fig. 3 is a detail perspective view of the under side of the valve.

In the drawings the same reference characters indicate the same parts of the invention.

1 denotes the body of the pan, and 2 its hollow neck. Passing transversely through the neck of the pan and journaled in the sides thereof is a shaft 3, provided with an operating-handle 4, located on the outside of the neck. A spiral spring 4' is connected to this shaft and to the outside of the neck of the funnel.

5 denotes a valve, which consists of the plate corresponding in outline to the area of the neck of the pan and adapted to closely fit the interior walls thereof. This valve is loosely secured to the transverse shaft.

6 denotes a bolt, which is connected to the transverse shaft by a bowed spring 6' and has a reciprocating movement in the guide 7, secured to the bottom of the valve. The free end of this bolt is adapted to be shot through the hole 8 in the side of the neck and lock the valve in a horizontal position across said neck.

9 denotes an inclined shield secured within the neck of the pan and which projects over the edge of the valve when the same is tilted to discharge the contents of the pan, so as to direct the material through the main discharge and prevent it passing down along the under side of the valve and engaging and clogging the movable parts carried thereby.

In operation after the desired amount has been weighed it is discharged by operating the handle 4. In turning this handle the spring-actuated bolt 6 will be withdrawn from the hole 8 in the neck of the funnel and will permit the valve to swing downward under its load. A reverse movement of the handle will restore the valve to a horizontal position, as shown in Fig. 2, and when it reaches this position the spring-actuated bolt will automatically shoot into the hole in the neck of the pan.

From the foregoing description, taken in connection with the accompanying drawings, the construction, operation, and advantages of my improved scale-pan will be readily apparent without requiring an extended explanation. It will be seen that the device is simple, that its construction permits of its manufacture at small cost, and that it is exceedingly well adapted for the purpose for which it is designed, and it will of course be understood that various changes in the form, proportion, and the minor details of construction may be resorted to without departing from the principle or sacrificing any of the advantages of my invention.

Having thus described the invention, what is claimed, and desired to be secured by Letters Patent, is—

A scale-pan provided with a hollow neck, a transverse shaft extending across said neck, a spring connected eccentrically to said shaft at one end and to the neck at the other, a valve-plate located within said neck and loosely connected to said shaft, and a bolt having one end secured eccentrically to said shaft by a spring, said bolt being supported in guides carried by the under side of the valve-plate and adapted to have its free end shot through an opening in the wall of said neck by the last-named spring and lock the valve-plate in horizontal position, substantially as and for the purpose set forth.

In testimony whereof I have hereunto set my hand in presence of two subscribing witnesses.

WILLIAM GASTON MIZELL.

Witnesses:
SOL. CHERRY,
F. M. DUNSTAN.